Aug. 24, 1937.   J. T. SANDBERG   2,090,903
FURNACE OR THE LIKE FOR CONTINUOUS COMBUSTION
Filed June 12, 1935
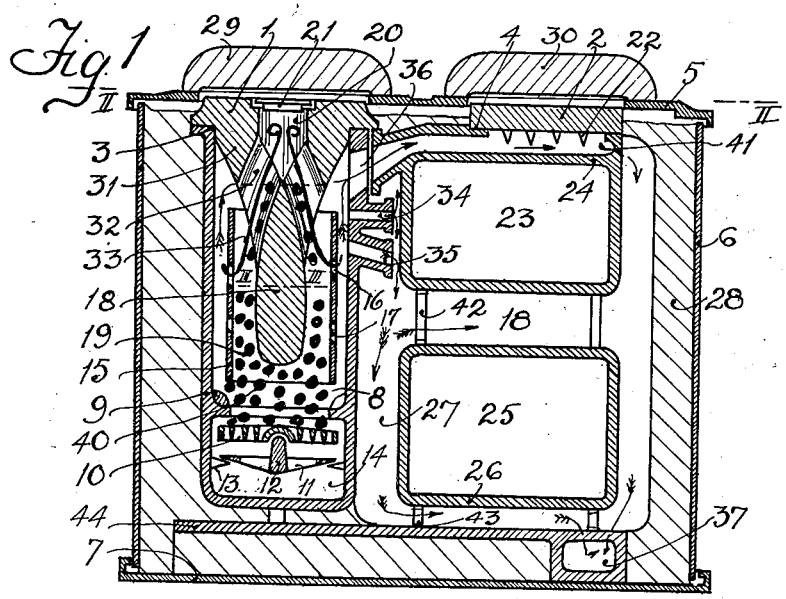
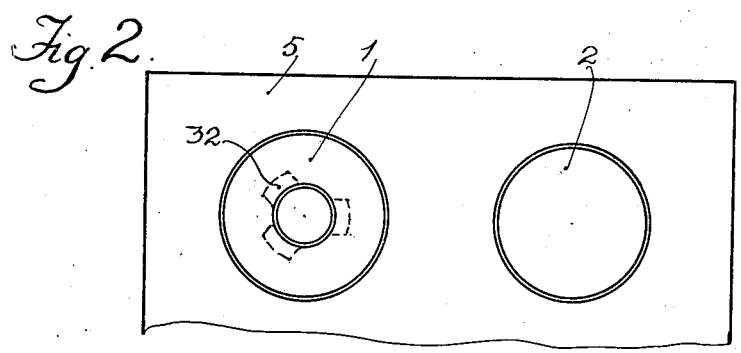
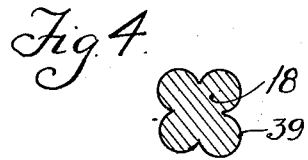
Inventor:
James Torsten Sandberg Patented Aug. 24, 1937

2,090,903

UNITED STATES PATENT OFFICE 2,090,903

FURNACE OR THE LIKE FOR CONTINUOUS COMBUSTION

James Torsten Sandberg, Stockholm, Sweden

Application June 12, 1935, Serial No. 26,252
In Sweden June 15, 1934

6 Claims. (Cl. 126—10)

My invention relates to furnaces, stoves or the like for solid fuels and particularly to stoves of the type having a chamber for continuous combustion comprising a fuel magazine arranged above a fuel burning grate and below a cooking plate or plates adapted to radiate heat to the cooking vessels.

The principal object of my invention is to provide a stove of the type described having a massive solid heat conducting body connected with a cooking plate and extending into the fuel magazine to conduct heat therefrom to the cooking plate, said heat conducting body and cooking plate being separated from the casing of the fuel magazine so as to permit the casing and the heat conducting body to expand freely in relation to each other according to the heat conditions.

Another object of my invention is to provide a stove of the type described having means for charging the fuel magazine with solid fuel, said means comprising a passage in a cooking plate which passage continues downwardly by a channel or channels opening into the fuel magazine. Thereby it will be possible for the combustion gases directly to transmit heat from underneath the cooking plate to the whole surface thereof and to expose a cooking vessel directly to the action of the combustion gases through said passage in the cooking plate.

These and further objects of my invention will be apparent according as the following description proceeds reference being had to the accompanying drawing showing a preferred embodiment of my improved stove.

In the drawing:—

Fig. 1 is a vertical cross sectional view of the stove.

Fig. 2 is a plan view seen along the line II—II in Fig. 1.

Fig. 3 is a sectional view along the line III—III in Fig. 1 on a somewhat enlarged scale.

Fig. 4 is a sectional view similar to Fig. 3 showing a modification.

According to the drawing the stove comprises an outer casing 6 having a base 7 and a top plate 5 with apertures for cooking plates 1 and 2. Provided below cooking plate 1 is a cylinder 9 serving as support for cooking plate 1 and forming a combustion chamber 8 and enclosing at its lower end a burning grate 10 consisting of a plate 11 turnable on a pivot 12 supported on shoulders 13 in the cylinder 9. Arranged below the grate is an ash pit 14 adapted to permit air to enter the combustion chamber. Arranged within the combustion chamber 8 is an inner casing 15, e. g. of cylindrical shape and of smaller diameter than cylinder 9. Casing 15 may extend to a more or less high level and is provided with holes 16, 17 to effect air and gas circulation. Extending into casing 15 is a massive solid heat conducting body 18 which is in close contact with cooking plate 1, e. g. is made integral therewith. Casing 15 and heat conducting body 18 form an annular fuel magazine 19 between them.

The cooking plate 1 is provided with a passage 20 closed by a cover 21. The cooking plate 2 is provided with downwardly extending heat absorbing projections 22. Arranged below the cooking plate 2 is a casing 24 serving as support for cooking plate 2 and forming an oven chamber 23 to be used for baking, roasting and similar purposes. Arranged below said casing 24 is another casing 26 forming another oven chamber 25. Arranged between cylinder 9 on the one hand and oven chambers 23 and 25 on the other hand is a space 27 preferably in the form of a channel in an insulation 28 and connected with the combustion chamber 8 by means of channels 34, 35.

The heat conducting body 18 may have the form of a cylindrical or downwardly tapering tube. Preferably this body is massive having longitudinally extending incisions and corresponding projections to increase its heat absorbing surface as shown at 38 in Fig. 3 or at 39 in Fig. 4. The cooking plates 1 and 2 are covered by protecting hoods 29 and 30, respectively, to preserve the heat accumulated in them.

Arranged between cooking plate 1 and heat conducting body 18 is a space 32 opening into casing 15. The solid fuel is introduced into fuel magazine 19 through passage 20 in cooking plate 1, a passage 31 and said space 32. Heat developed by the fuel burning in the combustion chamber 8 is transmitted from space 40 in which the highest temperature occurs, to cooking plate 1 by the heat conducting body 18. Part of the combustion gases passes through channels 34, 35, spaces 36 and 41 to oven chambers 23 and 25 and thence through a channel 37 arranged at the bottom of the stove to escape through a chimney in any desired manner.

By suitably adjusting the passage area of channels 35 and 37 more or less heat may be transmitted to oven chambers 23 and 25.

Casing 15 is vertically adjustable into varying positions or may be wholly removed and replaced by another casing to vary the size of the combustion chamber to suit fuels of different kinds.

To remove or adjust casing 15 rods 33 are introduced through space 32 and inserted into the holes 16, 17 of the casing.

The stove may be charged with solid fuel of different kinds, as for instance coke, coal, turf, charcoal, coal powder, briquettes of all kinds, naphthalene, wood of different kinds such as wood chips, cutter chips, splinters or the like, either alone or two or more in combination. The casing may be made of fire-proof steel and the cylinder 9 of fire-proof material, preferably metal.

What I claim is:

1. In combination, a casing forming a chamber and having a solid fuel burning grate therein, a massive solid heat conducting body extending from the top of said casing into said chamber and being spaced from the side walls of said casing and from said grate to define a combustion chamber, the body having a top cooking face and serving to conduct heat from the combustion chamber to said face, the body being provided with fuel feeding duct means leading downwardly from said cooking face and thence laterally whereby to first discharge fuel into the space between said body and casing wall and thence onto said grate, and a flue opening in said casing adjacent the top of said last named space.

2. In combination, a casing forming a chamber and having a solid fuel burning grate therein, a solid heat conducting body extending from the top of said casing into said chamber and being spaced from the side walls of said casing and from said grate to define a combustion chamber, the body having a top cooking face and serving to conduct heat from the combustion chamber to said face, the body being provided with fuel feeding duct means leading downwardly from said cooking face and thence laterally, an inner casing surrounding the heat conducting body from the lowest part to such a height that the fuel feeding duct means discharges fuel into a fuel magazine formed by the space between said inner casing and the heat conducting body, said fuel magazine being surrounded by the combustion chamber, and a flue opening in the outer casing wall adjacent the top of the combustion chamber.

3. In combination, a casing forming a chamber and having a solid fuel burning grate therein, a massive solid heat conducting body extending from the top of said casing into said chamber and being spaced from the side walls of said casing and from said grate to define a combustion chamber, the body having a top cooking face and serving to conduct heat from the combustion chamber to said face and being provided with incisions and corresponding projections to increase the heat absorbing surface, the body being provided with fuel feeding duct means leading downwardly from said cooking face and thence laterally whereby to first discharge fuel into the space between said body and casing wall and thence onto said grate, and a flue opening in said casing adjacent the top of said last named space.

4. In combination, a casing forming a chamber and having a solid fuel burning grate therein, a massive solid heat conducting body extending from the top of said casing into said chamber and being spaced from the side walls of said casing and from said grate to define a combustion chamber, the body having a top cooking face and serving to conduct heat from the combustion chamber to said face and being provided with incisions and corresponding projections to increase the heat absorbing surface, the body being provided with fuel feeding duct means leading downwardly from said cooking face and thence laterally, an inner casing surrounding the heat conducting body from the lowest part to such a height that the fuel feeding duct means discharges fuel into a fuel magazine formed by the space between said inner casing and the heat conducting body, said fuel magazine being surrounded by the combustion chamber, and a flue opening in the outer casing wall adjacent the top of the combustion chamber.

5. In combination, a casing forming a chamber and having a solid fuel burning grate therein, a massive solid heat conducting body extending from the top of said casing into said chamber and being spaced from the side walls of said casing and from said grate to define a combustion chamber, the body having a top cooking face and serving to conduct heat from the combustion chamber to said face, the body being provided with fuel feeding duct means leading downwardly from said cooking face and thence laterally, an inner casing surrounding the heat conducting body from the lowest part to such a height that the fuel feeding duct means discharges fuel into a fuel magazine formed by the space between said inner casing and the heat conducting body, said fuel magazine being surrounded by the combustion chamber, said casing being vertically adjustable, and a flue opening in the outer casing wall adjacent the top of the combustion chamber.

6. In combination, a casing forming a chamber and having a solid fuel burning grate therein, a massive solid heat conducting body extending from the top of said casing into said chamber and being spaced from the side walls of said casing and from said grate to define a combustion chamber, the body having a top cooking face and serving to conduct heat from the combustion chamber to said face, the body being provided with fuel feeding duct means leading downwardly from said cooking face and thence laterally, an inner casing surrounding the heat conducting body from the lowest part to such a height that the fuel feeding duct means discharges fuel into a fuel magazine formed by the space between said inner casing and the heat conducting body, said fuel magazine being surrounded by the combustion chamber, said casing being perforated in order to effect air and gas circulation, and a flue opening in the outer casing wall adjacent the top of the combustion chamber.

JAMES TORSTEN SANDBERG.